United States Patent
Maslov et al.

(10) Patent No.: US 6,794,839 B1
(45) Date of Patent: Sep. 21, 2004

(54) PRECISION MOTOR CONTROL WITH SELECTIVE CURRENT WAVEFORM PROFILES IN SEPARATE STATOR CORE SEGMENTS

(75) Inventors: Boris A. Maslov, Reston, VA (US); Matthew G. Feemster, Chantilly, VA (US)

(73) Assignee: Wavecrest Laboratories, LLC, Dulles, VA (US)

(*) Notice: Subject to any disclaimer, the term of this patent is extended or adjusted under 35 U.S.C. 154(b) by 0 days.

(21) Appl. No.: 10/290,537

(22) Filed: Nov. 8, 2002

(51) Int. Cl.[7] .............................................. H02P 29/00
(52) U.S. Cl. .................... 318/439; 318/724; 318/138; 310/259; 310/216
(58) Field of Search .......................... 318/254, 138, 318/439, 720, 721, 722, 723, 724, 811, 599, 379, 560; 310/259, 216, 218, 74, 156.01–156.74

(56) References Cited

U.S. PATENT DOCUMENTS

| | | | | |
|---|---|---|---|---|
| 4,315,171 A | * | 2/1982 | Schaeffer | 310/49 R |
| 4,429,262 A | * | 1/1984 | Utenick | 318/254 |
| 4,591,746 A | * | 5/1986 | Kamiyama | 310/70 A |
| 4,651,068 A | * | 3/1987 | Meshkat-Razavi | 318/254 |
| 5,034,675 A | | 7/1991 | Nerowski et al. | |
| 5,038,090 A | * | 8/1991 | Kawabata et al. | 318/721 |
| 5,227,702 A | * | 7/1993 | Nahirney | 318/138 |
| 5,258,697 A | | 11/1993 | Ford et al. | |
| 5,365,137 A | | 11/1994 | Richardson et al. | |
| 5,583,411 A | * | 12/1996 | Kusano et al. | 318/719 |
| 5,834,918 A | * | 11/1998 | Taylor et al. | 318/601 |
| 5,994,814 A | * | 11/1999 | Kawabata et al. | 310/216 |
| 6,002,234 A | * | 12/1999 | Ohm et al. | 318/729 |
| 6,093,984 A | * | 7/2000 | Shiga et al. | 310/26 |
| 6,194,865 B1 | * | 2/2001 | Mitsui et al. | 318/811 |
| 6,380,646 B1 | * | 4/2002 | Bernauer et al. | 310/49 R |
| 6,465,975 B1 | * | 10/2002 | Naidu | 318/430 |
| 2002/0190672 A1 | * | 12/2002 | Karikomi | 318/139 |

FOREIGN PATENT DOCUMENTS

| | | |
|---|---|---|
| DE | 195 03 492 A1 | 8/1998 |
| DE | 197 04 576 A1 | 8/1998 |
| EP | 0 006 669 A1 | 1/1980 |
| EP | 0 866 547 A1 | 9/1998 |
| WO | WO 90/11641 | 10/1990 |

* cited by examiner

Primary Examiner—David Martin
Assistant Examiner—Eduardo Colon Santana
(74) Attorney, Agent, or Firm—McDermott, Will & Emery (57) ABSTRACT

A control system is provided for a multiphase motor having a plurality of stator phase components, each stator phase component comprising a phase winding formed on a core element, and a permanent magnet rotor. A plurality of motor control schemes are stored in memory. Subject to user or system selection, one of the motor control schemes is accessed from the memory by a controller for implementation. The controller generates control signals that are applied to energization circuitry for supplying current to the phase windings with a particular current waveform profile in accordance with the selected motor control scheme. The controller has an input terminal for receiving a user initiated torque command signal representing a desired motor torque. Each motor control scheme provides motor driving current that corresponds to torque command signals received at the controller input terminal.

19 Claims, 8 Drawing Sheets

PRECISION MOTOR CONTROL WITH SELECTIVE CURRENT WAVEFORM PROFILES IN SEPARATE STATOR CORE SEGMENTS

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,102, of Maslov et al., filed Oct. 1, 2001, U.S. application Ser. No. 09/993,596 of Pyntikov et al., filed Nov. 27, 2001, and U.S. application Ser. No. 10/173,610, of Maslov et al., filed Jun. 19, 2002, all commonly assigned with the present application. The disclosures of these applications are incorporated by reference herein.

FIELD OF THE INVENTION

The present invention relates to control of brushless permanent magnet motors, more particularly to selective implementation of one of a plurality of motor control schemes to effect an associated stator current waveform profile.

BACKGROUND

The above-identified copending patent applications describe the challenges of developing efficient electric motor drives for vehicles, as a viable alternative to combustion engines. Electronically controlled pulsed energization of motor windings offers the prospect of more flexible management of motor characteristics. By control of pulse width, duty cycle, and switched application of a battery source to appropriate stator windings, broad functional versatility can be achieved. The use of permanent magnets in conjunction with such windings is advantageous in limiting current consumption.

In a vehicle drive environment, wherein power availability is limited to an on-board supply, it is highly desirable to attain a high torque output capability at minimum power consumption. Motor structural arrangements described in the copending applications contribute to these objectives. As described in those applications, electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects from interaction other electromagnet members.

The above-identified copending application Ser. No. 10/173,610 describes a control system for a multiphase motor that compensates for variations in individual phase circuit elements. A high degree of precision controllability is obtained with each phase control loop closely matched with its corresponding winding and structure. Successive switched energization of each phase winding is governed by a controller that generates signals in accordance with parameters associated with the respective stator phase components. The phase windings are energized with current of sinusoidal waveform for high efficiency operation. The control system varies the output current to respond to, and accurately track, the user's torque command input.

The sinusoidal current waveform profile obtained with this commutation strategy can extend battery life through efficient operation. However, in vehicle driving operation there is often the need for torque capability in excess of that available from the most efficient control scheme. Typically, the power supply is rated for a maximum current discharge rate, for example, 10.0 amps. If the user of the system requests a torque command that correlates to this maximum current draw, then the motor torque output for a sinusoidal current waveform profile is limited, for example, to approximately 54.0 Nm in a motor with a configuration such as described above. In vehicle drive applications, torque input commands are associated by users with commands for change of speed. In typical driving operation, user torque requests are subject to wide variability with little, if any, predictability. A driver may demand higher acceleration or greater speed than the system can accommodate at maximum torque with a sinusoidal current waveform. Driving conditions, such as steep uphill grade or heavy vehicle load or the like, may impose other limitations on available speed and acceleration.

The need thus exists for a vehicle motor control system that is capable of performing with high efficiency yet can deliver increased torque output when required by the user.

DISCLOSURE OF THE INVENTION

The present invention fulfills this need by making available a plurality of motor control schemes for a motor drive, each of which can provide a unique current waveform profile. An advantage of the invention is that one of the motor control schemes may be selected to obtain a current waveform profile that has the greatest capability to meet operating objectives. For example, a control scheme may be selected that yields high efficiency operation, such as a sinusoidal waveform, while another control scheme may be selected that provides higher torque, albeit with less operating efficiency.

An additional advantage of the invention is that selection between motor control schemes may be made by the user in accordance with the user's needs or objectives with respect to torque and efficiency, or other factors, e.g., low torque ripple and noise, etc., at any particular time. In accordance with the motor control schemes selected, control signals are generated to energize the motor winding with current waveform profiles that are associated therewith.

The present invention may be manifested in a control system for a multiphase motor having a plurality of stator phase components, each stator phase component comprising a phase winding formed on a core element, and a permanent magnet rotor. Preferably, each of the stator core elements comprises ferromagnetic material separated from direct contact with the other core elements, each stator phase component thereby forming an autonomous electromagnet unit.

A plurality of motor control schemes are stored in memory. Subject to user or system selection, one of the motor control schemes is accessed from the memory by a controller for implementation. The controller generates control signals that are applied to energization circuitry for supplying current to the phase windings with a particular current waveform profile in accordance with the selected motor control scheme. The controller has an input terminal for receiving a user initiated torque command signal representing a desired motor torque. Each motor control scheme provides motor driving current that corresponds to torque command signals received at the controller input terminal. The controller has a second input terminal for receiving a user initiated selection command signal representing a stored motor control scheme, the controller accessing the corresponding motor control scheme from memory for implementation.

One of the stored motor control schemes may be a default scheme that is accessed by the controller from the memory in the absence of a signal received at the second controller input terminal. Preferably, the default motor control scheme corresponds to a current waveform profile, such as a substantially sinusoidal waveshape, which provides relative optimum operating efficiency. Another of the stored motor control schemes may provide a current waveform profile for maximum torque response, such as a substantially rectangular waveshape.

The energization circuitry may comprise a plurality of controllable switches, each phase winding connected respectively to one or more of the switches. A pulse width modulation conversion circuit may be connected to receive the control signals output from the controller to convert those signals to pulse width modulated signals that are applied to control terminals of the controllable switches. As an alternative, each stator phase winding may be connected to a power source via an amplifier having an input terminal coupled to the controller output.

The controller may have a plurality of inputs for receiving feedback signals representing various motor conditions. A current sensor preferably is coupled to each phase winding and connected to one of the controller inputs. Another controller input is coupled to receive rotor position signals produced by a rotor position sensor. Rotor speed signals may be received at another controller input. Each control scheme, when implemented, thus may be responsive to the current sensed in each phase winding, to rotor position and rotor speed.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OR THE INVENTION

Figure 1:
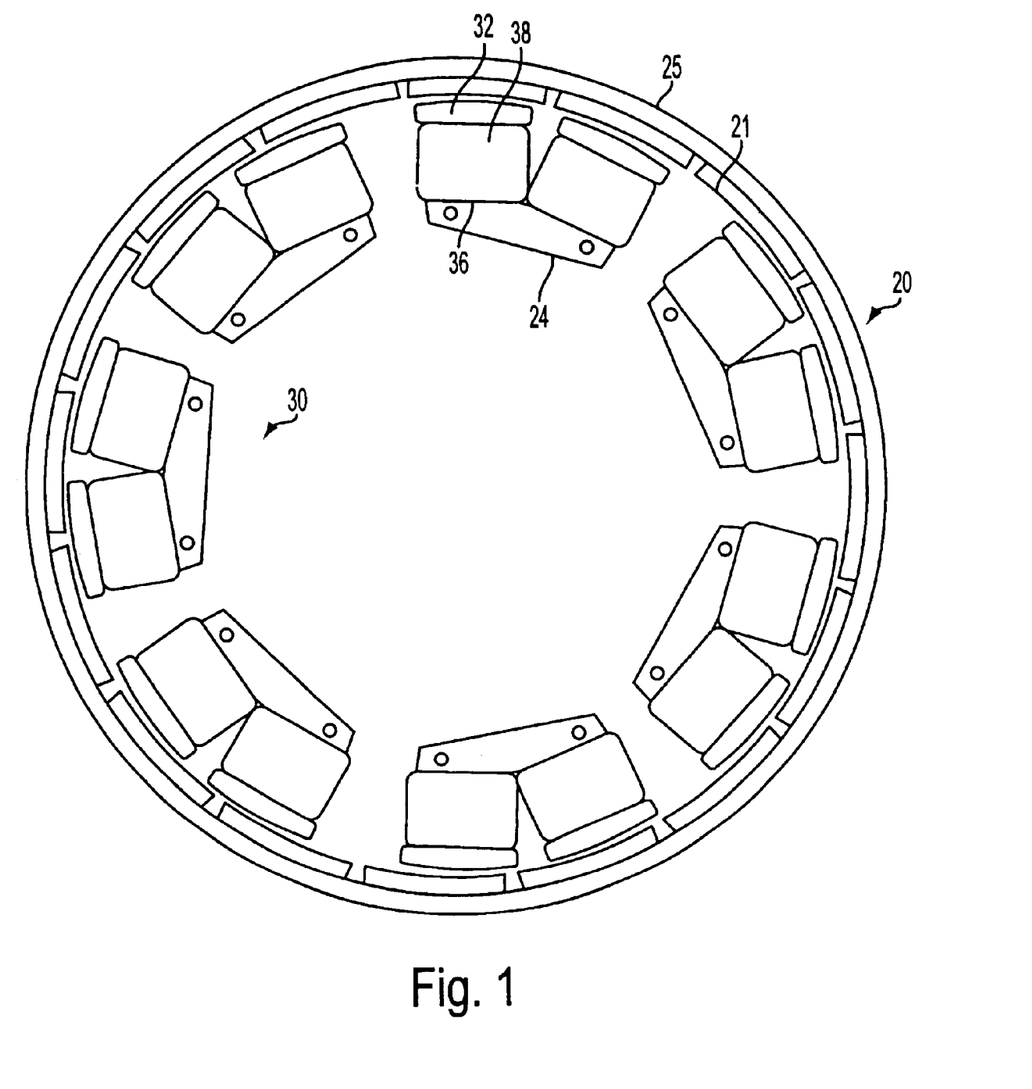
FIG. 1 is an exemplary view showing rotor and stator elements in a configuration that may be employed in the present invention.

The present invention is applicable to a motor such as disclosed in the copending application Ser. No. 09/826,422, although the invention can be used with various other permanent magnet motors. FIG. 1 thus is an exemplary view showing rotor and stator elements as described in that application, the disclosure of which has been incorporated herein. Rotor member 20 is an annular ring structure having permanent magnets 21 substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally U-shaped magnetic structure 36 that forms two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. The stator electromagnets are thus autonomous units comprising respective stator phases. The concepts of the invention, more fully described below, are also applicable to other permanent magnet motor structures, including a unitary stator core that supports all of the phase windings.

Figure 2:
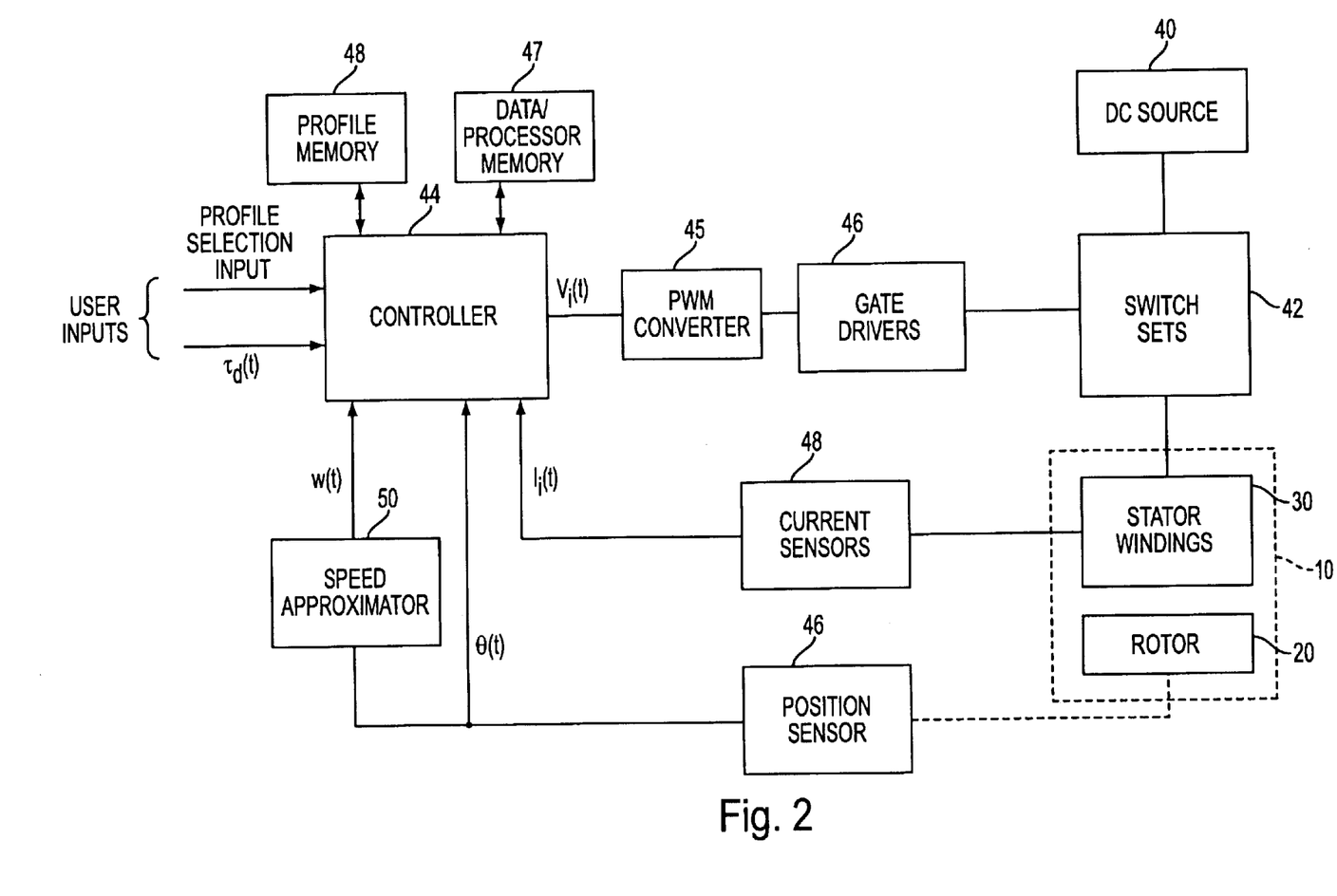
FIG. 2 is a block diagram of a motor control system in accordance with the present invention.

FIG. 2 is a block diagram of a motor control system in accordance with the present invention. Multiphase motor 10, which may be structurally configured as shown in FIG. 1, is shown generally as comprising rotor 20 and stator 30. The stator has a plurality of phase windings that are switchably energized by driving current supplied from d-c power source 40 via electronic switch sets 42. The switch sets are coupled to controller 44 via pulse width modulation converter 45 and gate drivers 46. Controller 44 has a plurality feedback inputs representing motor conditions sensed during operation. Current in each phase winding is sensed by a respective one of a plurality of current sensors 48 whose outputs are provided to controller 44. The controller may have a plurality of inputs for this purpose or, in the alternative, signals from the current sensors may be multiplexed and connected to a single controller input. Rotor position sensor 46 is connected to another input of controller 44 to provide position signals thereto. The output of the position sensor is also applied to speed approximator 50, which converts the position signals to speed signals to be applied to another input of controller 44. The controller also has user inputs, including a torque command input $\tau_d(t)$, and a profile selection command input.

The controller may comprise a microprocessor or equivalent microcontroller, such as Texas Instrument digital signal processor TMS320LF2407APG. Adjunct to the controller are memory blocks 47 and 49. Memory block 47, in which random data and program data are stored, may comprise a plurality of ROMs and RAMs. Profile memory 49 is shown separately in the drawing for purposes of illustration of the inventive concepts. The profile memory may comprise a ROM in which are stored the portions of the motor control scheme programs that dictate the motor current waveform profiles obtained with implementation of the associated control schemes.

Switch sets 42 may comprise a plurality of MOSFET H-Bridges, such as International Rectifier IRFIZ48N-ND. The gate driver may comprise Intersil MOSFET gate driver HIP40821B. The position sensor may comprise any known sensing means, such as a Hall effect devices (Allegro Microsystems 92B5308), giant magneto resistive (GMR) sensors, capacitive rotary sensors, reed switches, pulse wire sensors, amorphous sensors, resolvers, optical sensors and the like. Hall effect current sensors, such as F. W. Bell SM-15, may be utilized for currents sensors 48. The speed detector 50 provides an approximation of the time derivative of the sensed position signals. The PWM converter, illustrated as a separate functional block, may be embodied in the controller to convert voltage signals to corresponding pulse width modulated signals in a manner well known in the art.

Figure 3:
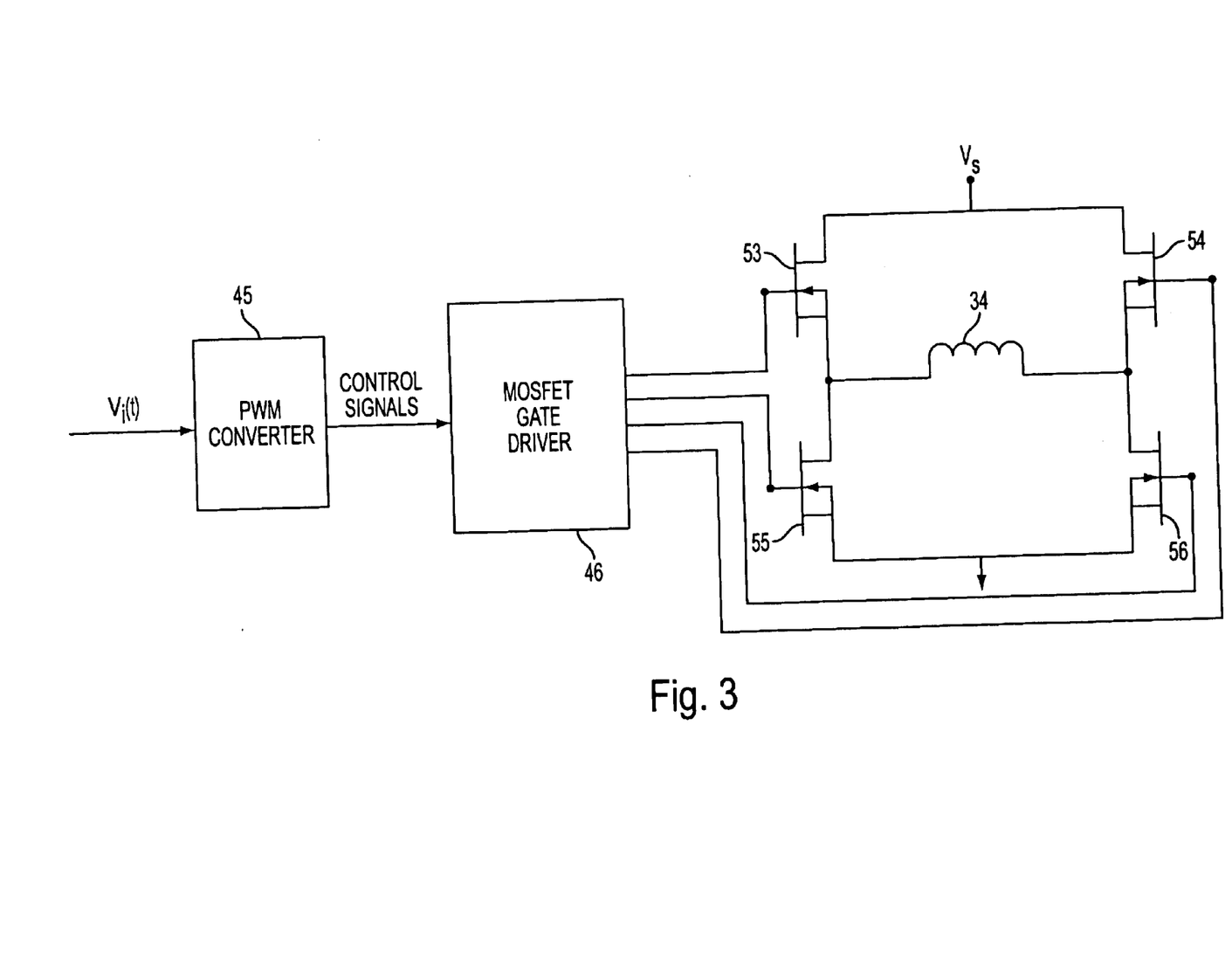
FIG. 3 is a partial circuit diagram of a switch set and driver for an individual stator core segment winding of a motor controlled by the system of FIG. 2.

FIG. 3 is a partial circuit diagram of a switch set and driver for an individual stator core segment winding phase. Stator phase winding 34 is connected in a bridge circuit of four FETs. It is to be understood that any of various known electronic switching elements may be used for directing driving current in the appropriate direction to stator winding 34 such as, for example, bipolar transistors. FET 53 and FET 55 are connected in series across the power source, as are FET 54 and FET 56. Stator winding 34 is connected between the connection nodes of the two series FET circuits. Gate driver 46 is responsive to control signals received from the sequence controller 44 to apply activation signals to the gate terminals of the FETs. FETs 53 and 56 are concurrently activated for motor current flow in one direction. For current flow in the reverse direction, FETs 54 and 55 are concurrently activated. Gate driver 46 alternatively may be integrated in sequence controller 44.

Figure 4:
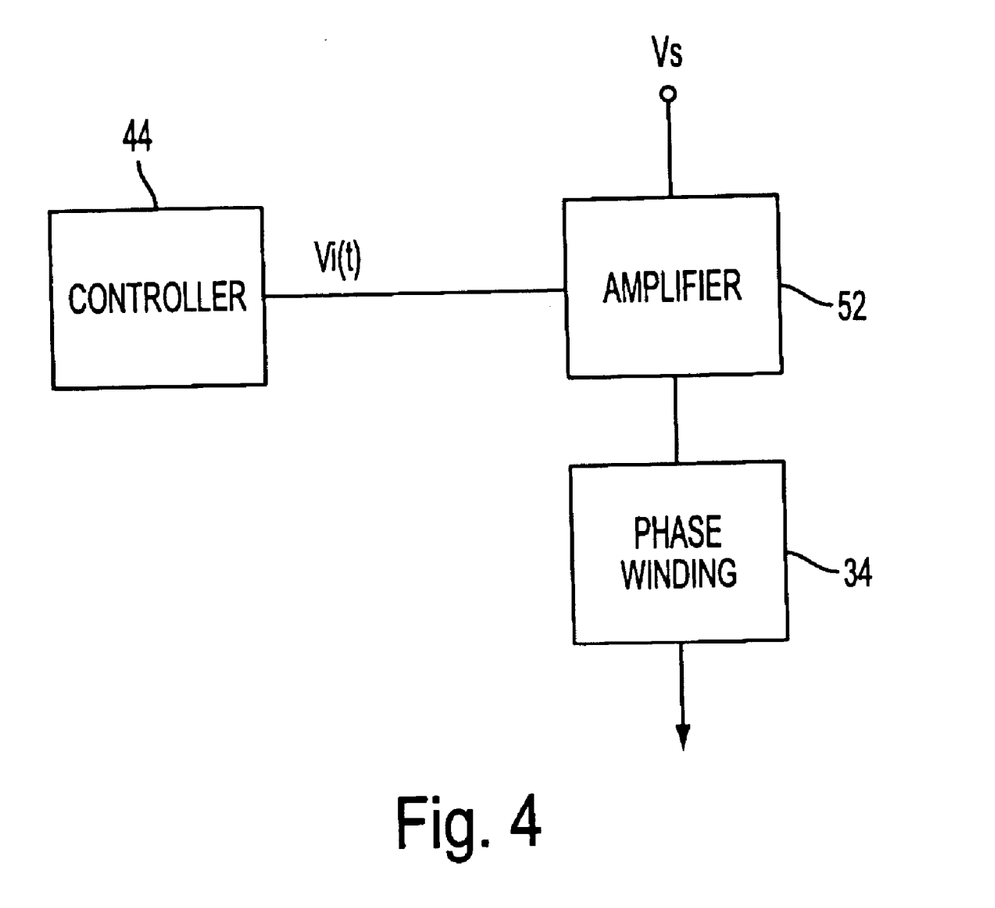
FIG. 4 is a block diagram of an alternative motor controlled by the system of FIG. 2.

As an alternative to the stator winding energization circuitry shown in FIG. 3, the switching bridges and gate driver components may be replaced by amplifiers, as shown FIG. 4, which depicts the energization arrangement for one of the phases. Phase winding 4 is coupled to source terminal $V_s$ through amplifier 52. The control terminal of the amplifier is coupled directly to the controller 44 to receive the time varying output control voltage signals $V_i(t)$.

In the vehicle drive application example, one of the user inputs to the controller represents required torque indicated by the user's throttle command. An increase in throttle is indicative of a command to increase speed, which is realized by an increase in torque. The control system torque tracking functionality should maintain steady state torque operation for any given input command through varying external conditions, such as changes in driving conditions, load gradient, terrain, etc. The control system should be responsive to the driver's throttle input to accommodate changes in torque commands.

The manner in which the control system responds to torque input commands is dependent upon the particular motor control scheme implemented. A significant aspect of the present invention is provision of a plurality of motor control schemes that are available by user selection to obtain a desired response. Each control scheme effects a particular motor current waveform profile having unique characteristics with respect to efficiency, torque capacity, response capability, power losses, etc., in comparison to other control schemes.

Figure 5:
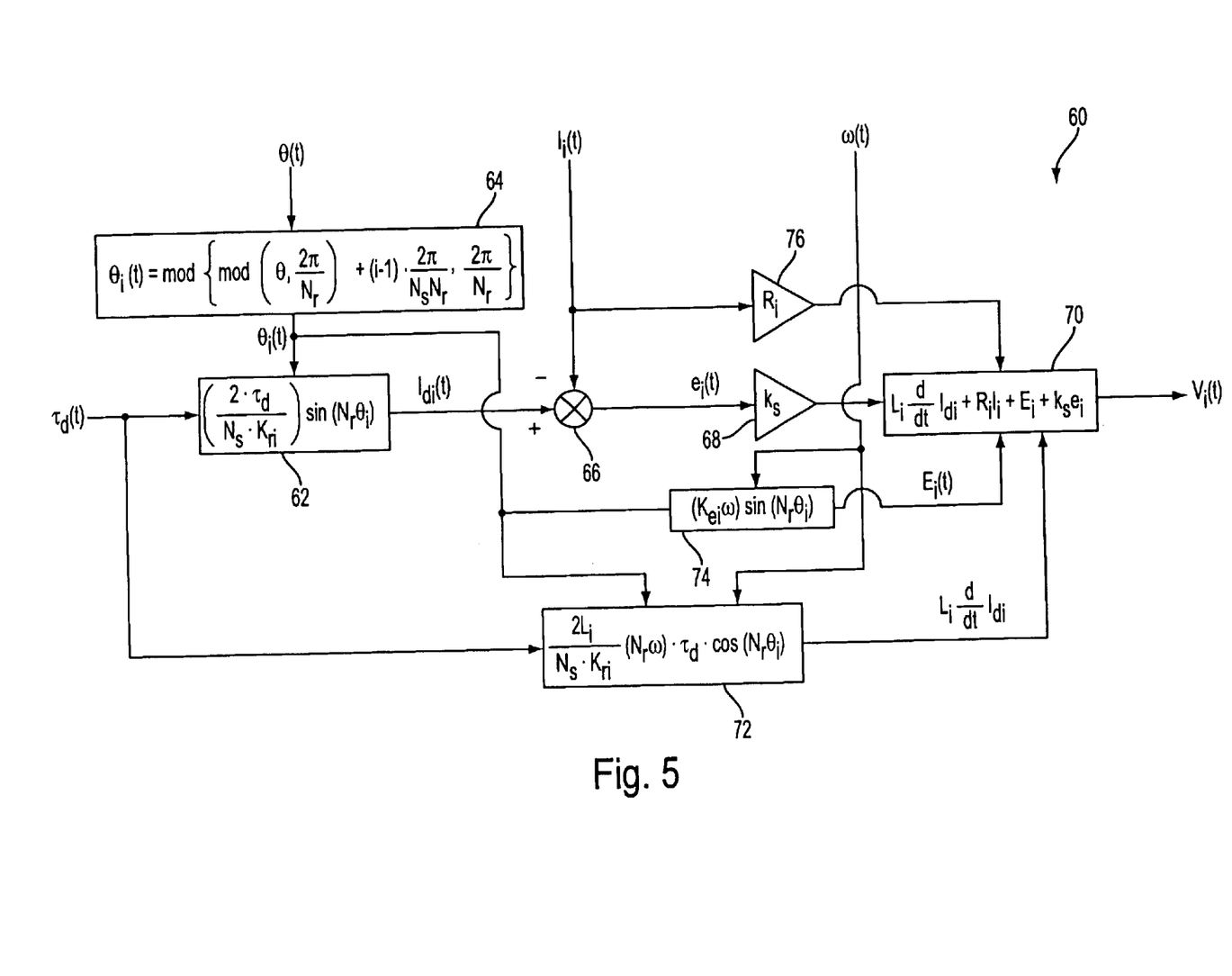
FIG. 5 is a block diagram that illustrates torque controller methodology for use in the control system of FIG. 2.

FIG. 5 is a block diagram that illustrates a motor control scheme utilized in the copending 10/173,610 application identified and incorporated herein above. Reference is made to that application for detailed description of operation. In order to develop the desired phase currents the following per-phase voltage control expression is applied to the driver for the phase windings:

$$V_i(t) = L_i dI_{di}/dt + R_i I_i + E_i + k_s e_i$$

FIG. 5 represents the methodology, generally indicated by reference numeral 60, by which the controller derives the components of this voltage expression in real time, utilizing the torque command input and the signals received from phase current sensors, position sensor and speed detector. Functional block 70 represents the formulation and addition of the components of the above expression to obtain the control voltage in real time. Each of the functional blocks 62, 64, 66, 68, 72, 74 and 76, shown as inputs to block 70, represents the generation of the various elements of the components obtained from real time inputs received by the controller or parameter constants.

Block 62 represents a precision torque tracking functionality, the per-phase desired current trajectories being selected according to the following expression:

$$I_{di} = \left(\frac{2\tau_d}{N_s K_{\tau i}}\right) \sin(N_s \theta_i)$$

where $I_{di}$ denotes per-phase desired current trajectory, $\tau_d$ denotes the user's requested torque command, N represents the total number of phase windings, $K_{\tau i}$ denotes a per-phase torque transmission coefficient and $\theta_i$ represents relative positional displacement between the $i^{th}$ phase winding and a rotor reference point. The per-phase current magnitude is dependent on the per-phase value of the torque transmission coefficient $K_{\tau i}$.

In operation, controller 44 successively outputs control signals $V_i(t)$, either pulse width modulated to the gate drivers of FIG. 3. or directly to the amplifiers of FIG. 4, for individual energization of respective phase windings. The gate drivers activate the respective switch sets so that the sequence in which windings are selected comports with a sequence established in the controller. The sequence is transmitted to the gate drivers through the link only generally illustrated in the diagram of FIG. 5. Each successive control signal $V_i(t)$ is related to the particular current sensed in the corresponding phase winding, the immediately sensed rotor position and speed, and also to model parameters, $K_{ei}$ and $K_{\tau i}$ that have been predetermined specifically for the respective phases.

The computations illustrated in FIG. 5 are performed successively in real time. The expression shown in block 62 in this motor control scheme provides the desired current component for the tracking torque output control signal $V_i(t)$ with a sinusoidal waveform profile. The sine wave current trajectory $I_{sin}(t)$ is generated from the following equation $$I_{sin} = I_m \sin(N_r \theta_i)$$

where $I_m$ denotes the phase current magnitude, $N_r$ denotes the number of permanent magnet pairs and $\theta_i$ denotes the measured per phase rotor position signal. As discussed below, this sinusoidal current waveform profile provides efficient motor operation.

Different expressions for block 62 can be used for the torque tracking functionality of FIG. 5 to obtain different current waveform profiles for manifesting other operational aspects, although sacrificing some of the efficiency achieved with the sinusoidal waveform profile. As an example, in a different motor control scheme, the expression of block 62 shown in FIG. 5 can be replaced with an expression yielding a square wave current waveform trajectory $I_{sq}(t)$, such as $$I_{sq} = I_m \, \text{sgn}(\sin(N_r \theta_i))$$

where sgn (x) denotes the standard signum function and is defined as 1 if x=>0,0 if x=0, and −1 if x<0.

Profile memory 49 stores data that are used by the controller to obtain the current values that satisfy the expressions exemplified above. If a control scheme is selected for which the sinusoidal waveform is produced, the corresponding profile memory data is accessed. Square wave profile memory data would be accessed if the corresponding control scheme is selected.

Profile memory data may be stored as lookup tables, each lookup table entry representing a current value for a particular combination of torque request value and rotor position. The current values for a lookup table are derived according to the particular profile expression used in block 62 of FIG. 5 for a particular waveform profile. While expressions for sinusoidal and square wave waveforms have been set forth above for purposes of illustration, other waveform profiles, such as sawtooth, etc., may be utilized for different operational purposes. In operation, a user can select an operational mode corresponding to a stored lookup table. The controller repeatedly accesses the lookup table based on the torque request input and the sensed rotor position to obtain the desired current value $I_{di}$, used as the output of block 62 in FIG. 5.

Alternatively, the profile memory may store data for each profile by which the desired current value $I_{di}$ is repeatedly computed by the controller in real time. Appropriate data are accessed from the profile memory in accordance with the profile mode selected by the user.

Figure 6A:
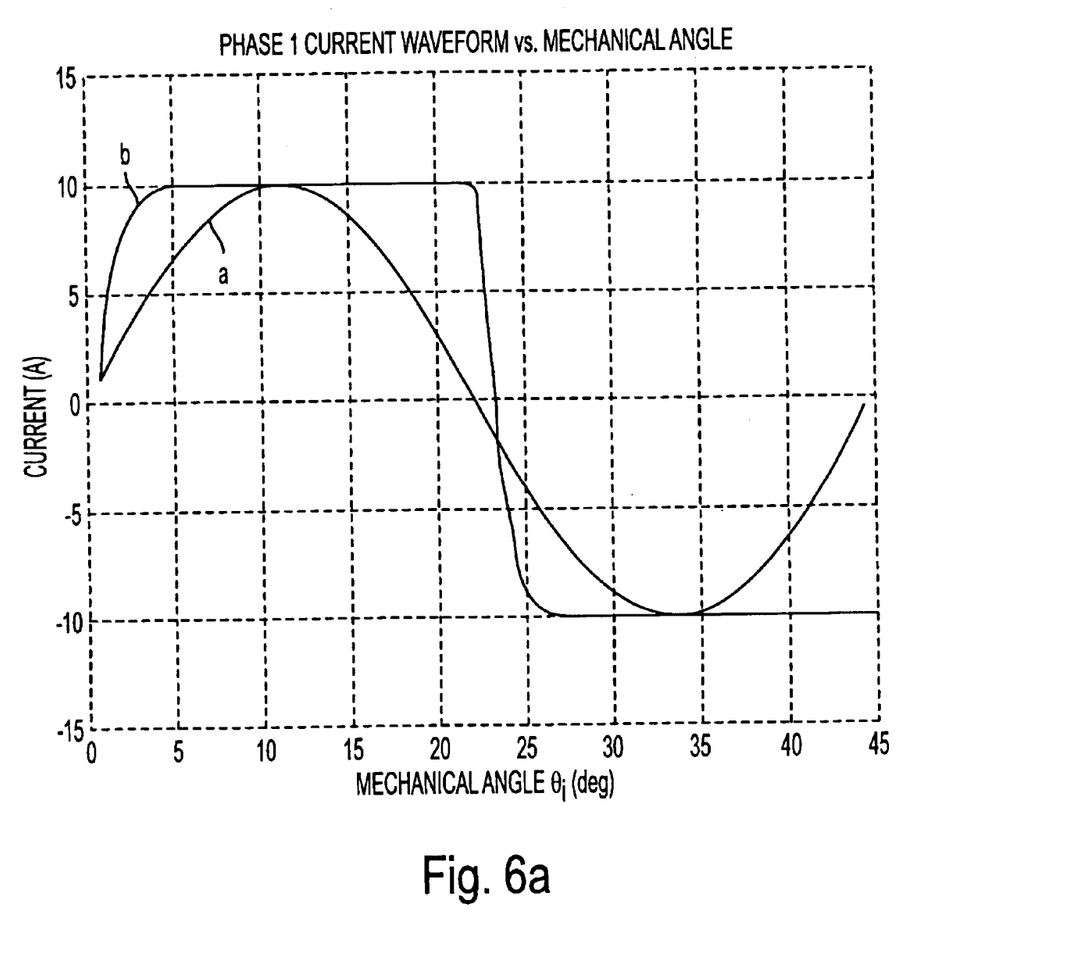
FIGS. 6a–6c are graphical representations illustrating comparison between the two different current waveform profiles that may be employed in the present invention.
Figure 6B:
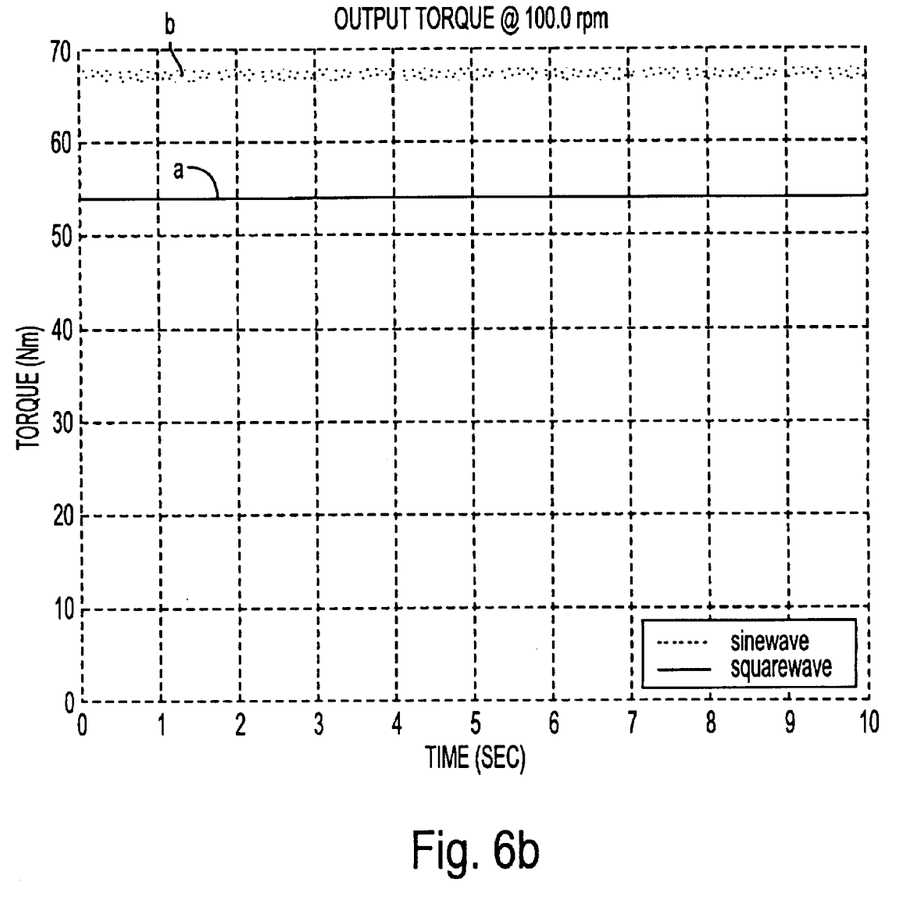
Figure 6C:
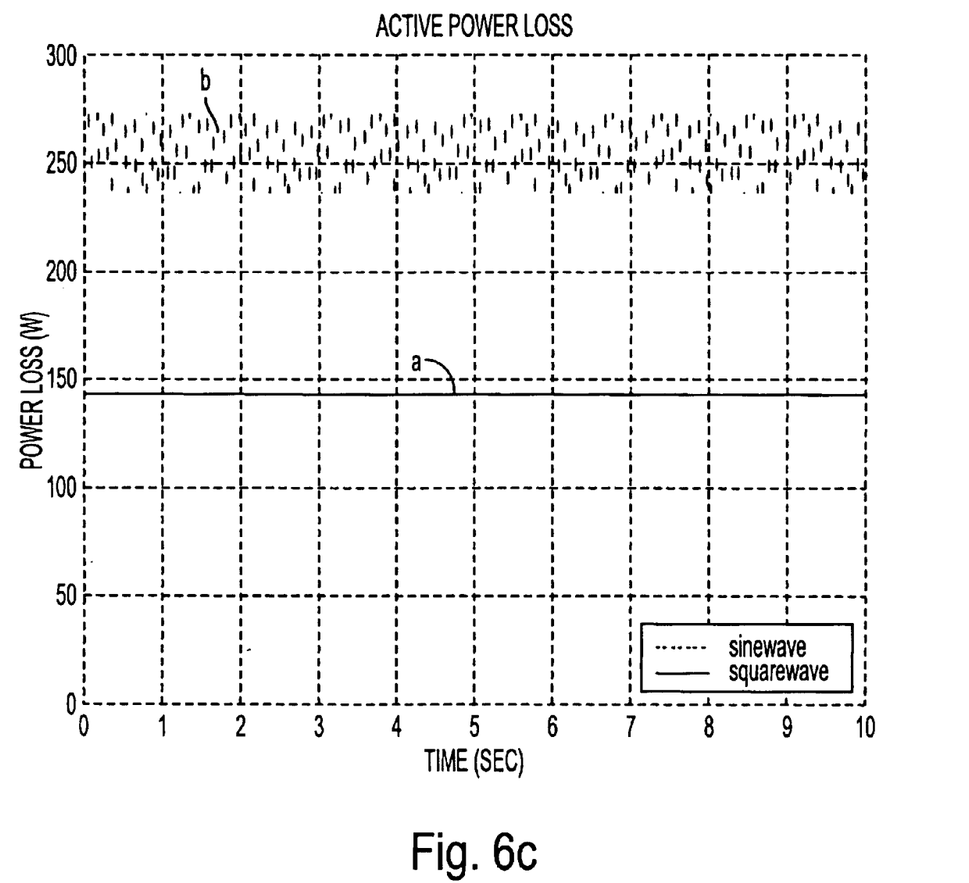

FIGS. 6a–6c are graphical representations illustrating comparison between the two different current waveform profiles discussed above. FIG. 6a shows current waveform versus mechanical angle for each profile. Curve a illustrates the sinusoidal waveform produced by the expression shown in block 62 of FIG. 5. Curve b illustrates a 100% duty cycle square wave. Other variations of the base square wave profile can be generated. In the example described earlier, the power supply of the system may be rated for a maximum current discharge rate of 10 amps. FIG. 6b illustrates the output torque produced by the sinusoidal profile (curve a) and the square wave profile (curve b) at maximum 10 amp current draw at a speed of 100 rpm. FIG. 6c illustrates the active power losses of the sinusoidal profile and square wave profile for these operating conditions.

With the sinusoidal waveform profile, if the user requests a torque command that correlates to the maximum current draw, then the motor output is limited to approximately 54 Nm. The square wave profile, however, can produce 68 Nm without exceeding the 10 amp maximum rating of the power supply. However, the increase in torque production of the square wave profile is gained at the expense of efficiency with respect to the sinusoidal profile.

The control system of this invention, illustrated in FIG. 2, provides the user a choice of different motor control schemes that operate with different current waveform profiles, such as the two profiles exemplified above. Profile memory 49 stores data corresponding to each such motor control scheme to provide the appropriate expression for functional block 62 of FIG. 5. In response to a user's command received at the profile selection input of controller 44, data for the selected motor control scheme is accessed from the profile memory to provide the functionality that produces the corresponding current waveform profile. In the vehicle example, the scheme for sinusoidal current waveform profile would be used to extend battery life through its more efficient operation. If the user wishes to generate more torque than what the sinusoidal profile can provide, the user can switch to the square wave trajectory by applying a command signal to the profile selection input to direct the controller to access from the profile memory the data for the appropriate motor control scheme. Optionally, a default mode, such as the sinusoidal profile scheme, can be set for implementation in the absence of a command at the profile selection input.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, various other current waveform profiles may be utilized. The profile memory thus may store a plurality of profiles accessible by the controller in response to receipt of specific profile selection commands. In addition, the concepts of the present invention are also applicable to other motor arrangements including wound rotor motors.

What is claimed is:

1. A control system for a multiphase motor operable over a range of speeds, said motor having a plurality of stator phase components and a rotor, each stator phase component comprising a phase winding formed on a core element, said system comprising:

energization circuitry connected to the stator phase windings for selective connection of each phase winding to a power source for energization thereof;

a controller for generating control signals corresponding to a particular current waveform, said control signals applied to said energization circuitry for energization of said phase windings; and a memory having stored therein a plurality of selectable motor control schemes corresponding respectively to different current waveform profiles, said memory accessible by said controller for selection of one of said motor control schemes to produce said particular current waveform;

wherein a selected one of said motor control schemes is implemented by said controller to provide to said stator phase windings energization current defined by the waveform profile corresponding to the selected motor control scheme for the entire operable motor speed range.

2. A control system as recited in claim 1, wherein said energization circuitry comprises a plurality of controllable switches, each phase winding connected respectively to one or more of the switches.

3. A control system as recited in claim 1, wherein said controller comprises an input terminal for receiving a user initiated torque command signal representing a desired motor torque and wherein the energization circuitry is responsive to the output signals of each of said motor control schemes, when selected, to provide motor driving current that corresponds to torque command signals received at the controller input terminal.

4. A control system as recited in claim 3, wherein one of said motor control schemes corresponds to a current waveform profile that provides torque response with relatively optimum operating efficiency.

5. A control system as recited in claim 4, wherein the relatively optimum operating efficiency current waveform profile has a substantially sinusoidal waveshape.

6. A control system as recited in claim 3, wherein one of said motor control schemes corresponds to a current waveform profile that provides relatively maximum torque response.

7. A control system as recited in claim 6, wherein the relatively maximum torque response current waveform profile has a substantially rectangular waveshape.

8. A control system as recited in claim 2, further comprising pulse width modulation conversion circuitry connected to said controller, for receiving said control signals therefrom, and to said controllable switches for applying pulse width modulated signals, converted from the received control signals, to control terminals of said controllable switches.

9. A control system as recited in claim 8, further comprising a current sensor coupled to each phase winding and connected to an input of the controller, and wherein the selected control scheme is responsive to the current sensed in each phase winding.

10. A control system as recited in claim 8, further comprising a rotor position sensor having an output coupled to said controller to provide rotor position signals thereto and wherein the selected control scheme is responsive to rotor position.

11. A control system as recited in claim 10, further comprising a speed signal generator coupled between the output of the position sensor and the controller to provide rotor speed signals thereto and wherein the selected control scheme is responsive to rotor speed.

12. A control system for a multiphase motor having a plurality of stator phase components and a rotor, each stator phase component comprising a phase winding formed on a core element, said system comprising:

energization circuitry connected to the stator phase windings for selective connection of each phase winding to a power source for energization thereof;

a controller for generating control signals applied to said energization circuitry for energization of said phase windings in accordance with a particular current waveform profile; and a memory having stored therein a plurality of motor control schemes corresponding respectively to different stator current waveform profiles, said memory accessible by said controller for selection of one of said motor control schemes;

wherein a selected one of said motor control schemes is implemented by said controller to output control signals to said energization circuitry, thereby providing to said stator phase windings energization current having the corresponding current waveform profile; and wherein said controller comprises a second input terminal for receiving a user initiated selection command signal representing a desired motor control scheme, said controller accessing a said stored motor control scheme from memory in accordance with a signal received at the second controller input.

13. A control system as recited in claim 12, wherein one of said plurality of motor control schemes is a default motor control scheme that is accessed by the controller from the memory in the absence of a signal received at the second controller input terminal.

14. A control system as recited in claim 13, wherein said default motor control scheme corresponds to a current waveform profile that provides relative optimum operating efficiency.

15. A control system for a multiphase motor having a plurality of stator phase components and a rotor, each stator phase component comprising a phase winding formed on a core element, said system comprising:

energization circuitry connected to the stator phase windings for selective connection of each phase winding to a power source for energization thereof;

a controller for generating control signals applied to said energization circuitry for energization of said phase windings in accordance with a particular current waveform profile; and a memory having stored therein a plurality of motor control schemes corresponding respectively to different stator current waveform profiles, said memory accessible by said controller for selection of one of said motor control schemes;

wherein a selected one of said motor control schemes is implemented by said controller to output control signals to said energization circuitry, thereby providing to said stator phase windings energization current having the corresponding current waveform profile; and wherein each of the stator core elements comprises ferromagnetic material separated from direct contact with the other core elements, each stator phase component thereby forming an autonomous electromagnet unit.

16. A method for controlling a multiphase motor operable over a range of speeds, said motor having a plurality of stator phase windings and a rotor, said method comprising the steps of:

storing a plurality of selectable motor control schemes corresponding respectively to different current waveform profiles;

selecting one of the stored motor control schemes;

generating control signals in accordance with the selected motor control scheme to produce a particular current waveform;

energizing the stator phase windings in response to the generated control signals to provide motor current defined by the current waveform profile that corresponds to the selected motor control scheme for the entire operable motor speed range.

17. A method as recited in claim 16, further comprising the step of issuing a torque command and the step of generating is responsive to the torque command; wherein the current provided by the energizing step corresponds to the torque command.

18. A method for controlling a multiphase motor having a plurality of stator phase windings and a rotor, said method comprising the steps of:

storing a plurality of motor control schemes corresponding respectively to different stator current waveform profiles;

selecting one of the stored motor control schemes;

generating control signals in accordance with the selected motor control scheme; and energizing the stator phase windings in response to the generated control signals to provide motor current having a current waveform profile that corresponds to the selected motor control scheme;

wherein the motor control scheme selected in the selecting step is a default scheme activated in the absence of a user selection.

19. A method for controlling a multiphase motor having a plurality of stator phase windings and a rotor, said method comprising the steps of: storing a plurality of motor control schemes corresponding respectively to different stator current waveform profiles;

selecting one of the stored motor control schemes, generating control signals in accordance with the selected motor control scheme; and energizing the stator phase windings in response to the generated control signals to provide motor current having a current waveform profile that corresponds to the selected motor control scheme;

wherein the motor is a permanent magnet rotor motor and the phase windings are formed respectively on ferromagnetically autonomous electromagnet core segments.

\* \* \* \* \*